Patented July 20, 1954

2,684,372

UNITED STATES PATENT OFFICE 2,684,372

2,7-DIAMINOTHIOXANTHOL DIOXIDE AND 2,7-DIAMINETHIOXANTHONE DIOXIDE

Edward Delbert Amstutz, Bethlehem, Pa., assignor to The Wm. S. Merrell Company, Cincinnati, Ohio, a corporation of Delaware No Drawing. Original application July 23, 1946, Serial No. 685,787. Divided and this application December 6, 1950, Serial No. 199,584

3 Claims. (Cl. 260—328)

The present invention relates to new chemical compounds and more particularly to 2,7-diaminothioxanthone dioxide and 2,7-diaminothioxanthenol dioxide. These compounds characterized by two aminophenyl groups linked together by a carbonyl or hydroxymethylene group and a sulfone ($SO_2$) group along with amino derivatives of the same are of value for combatting bacterial infections. The compounds may be represented by the following formula:

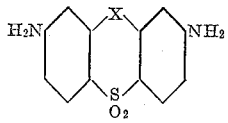

where X is selected from the group consisting of carbonyl and hydroxymethylene.

EXAMPLE I

2,7-diaminothioxanthone dioxide

This compound is conveniently prepared in a four-step process as follows:

(a) *5-nitro-2-(p-nitrothiophenoxy) benzaldehyde.*—A hot solution of 5-nitro-2-chlorobenzaldehyde (0.14 mole) and 350 ml. of alcohol is prepared and diluted with 140 ml. of warm water. p-Nitro-thiophenoxide (0.15 mole) is then added with stirring. The mixture is heated to reflux for about 1 hour, and after cooling the precipitate is filtered and washed successively with cold alcohol and water. The yield of 5-nitro-2-(p-nitrothiophenoxy) benzaldehyde is high.

(b) *Cyclization of 5-nitro-2-(p-nitrothiophenoxy benzaldehyde.*—The dry product obtained in step (a) (0.12 mole) is added with stirring to concentrated sulfuric acid (370 ml.) over a period of about 1 hour. The mixture is slowly heated to 60° C. and is maintained at this temperature for 15 mins., whereupon it is cooled and poured onto chipped ice (about 600 grams). The precipitate which separates is filtered, washed with water, and dried. The product is a mixture of 2,7-dinitrothioxanthone and 2,7-dinitrothioxanthene, which is not separated.

(c) *2,7-dinitrothioxanthone dioxide.*—The dry product from step (b) is heated to reflux with a mixture of glacial acetic acid (730 ml.) and 30% hydrogen peroxide (103 grams) for 4 hours. The reaction mixture is cooled and the precipitate is filtered and washed successively with water, sodium bicarbonate solution, and again with water. The yield of dry 2,7-dinitrothioxanthone dioxide is high.

(d) *2,7-diaminothioxanthone dioxide.*—A suspension of 2,7-dinitrothioxanthone dioxide (0.1 mole) in glacial acetic acid (135 ml.) is prepared and is heated to 80° on a steam bath. A solution of stannous chloride dihydrate (0.75 mole) in glacial acetic acid (450 ml.) saturated with gaseous hydrogen chloride is added gradually with stirring. After the addition of all the stannous chloride, heating is continued for about 2 hours at 80° C. The mixture is now cooled to 10° C. and the precipitate is removed by filtration and washed thoroughly with water. The washed filter cake is suspended in water made alkaline by the addition of sodium hydroxide solution, and the orange colored diamino compound is then filtered with suction, washed with water and dried. The crude product is heated to reflux with about 500 ml. of acetone. The hot mixture is filtered and the clear yellow filtrate concentrated to a volume of about 150 ml. Upon cooling the pure 2,7-diaminothioxanthone dioxide, M. P. 293.5–298° C., separates as a yellow crystalline powder in good yield.

EXAMPLE II

2,7-diaminothioxanthenol dioxide 2,7-dinitrothioxanthone dioxide (0.1 mole) in 80% acetic acid (400 ml.) is heated gradually to reflux with zinc dust (1.0 equivalent) which has previously been washed with hot dilute hydrochloric acid. The initial phase of the reduction is spontaneously exothermic and external heat is not required. The total reflux period is about 1 hour with the liquid becoming a pale yellow in color. The boiling mixture is then filtered to remove the excess zinc and the hot filtrate is diluted with 1500 ml. of hot water. On cooling, a colorless precipitate separates which is suction filtered, and washed with sodium bicarbonate solution followed by water. The yield of dry product, M. P. 204° C., is high. After recrystallization (Darco) from about 400 ml. of alcohol, the product melts at 212° C. with decomposition.

The compounds of the present invention contain two reactive amino groups and the hydrogen atoms in these groups may be replaced by various types of radicals. They may be acetylated, for example, by reaction with acetic anhydride in glacial acetic acid to form the respective diacetamido derivatives. With a large excess of acetic anhydride the 2,7-diaminothioxanthenol dioxide product forms the 9-acetoxy-2,7-diacetamido derivative. Other derivatives including the aldehyde sulfoxylate and bisulfite derivatives along with certain heterocyclic derivatives are disclosed and claimed in my copending applications. The present application is a division of my prior application Serial No. 685,787 filed July 23, 1946, now abandoned.

I claim:
1. Compounds represented by the formula:

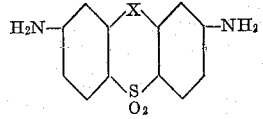

where X is selected from the group consisting of carbonyl and hydroxymethylene.

2. The product, 2,7-diaminothioxanthone dioxide.

3. The product, 2,7-diaminothioxanthenol dioxide.

References Cited in the file of this patent

UNITED STATES PATENTS

| Number | Name | Date |
|---|---|---|
| 2,149,335 | Dahlen | Mar. 7, 1939 |
| 2,338,516 | Kern et al. | Jan. 4, 1944 |
| 2,592,529 | Amstutz | Apr. 15, 1952 |

FOREIGN PATENTS

| Number | Country | Date |
|---|---|---|
| 253,714 | Germany | June 1, 1911 |
| 420,743 | Great Britain | Nov. 29, 1934 |
| 618,121 | Germany | Sept. 2, 1935 |

OTHER REFERENCES

Perkin et al., Beilstein (Handbuch, 4th ed.), vol. 18, p. 613 (1934).

Sachs, Beilstein (Handbuch, 4th ed.) vol. 18, p. 614 (1934).

Mauss, "Chemotherapy," Fiat Rev. of Ger. Science, Office of Military Gov't. for Ger. 1939-1946, p. 287 (1948).